(12) United States Patent
Lawall

(10) Patent No.: US 7,797,799 B2
(45) Date of Patent: Sep. 21, 2010

(54) DIRECTIONAL RETENTION DEVICE

(75) Inventor: Jennifer P. Lawall, Waterford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 235 days.

(21) Appl. No.: 11/970,098

(22) Filed: Jan. 7, 2008

(65) Prior Publication Data

US 2009/0172919 A1     Jul. 9, 2009

(51) Int. Cl.
     *A44B 1/28* (2006.01)
(52) U.S. Cl. .......................................... 24/104; 24/459
(58) Field of Classification Search ................... 24/104, 24/107, 108, 109, 112, 114.12, DIG. 51, 24/459, 453
     See application file for complete search history.

(56) References Cited

U.S. PATENT DOCUMENTS

| 359,616 | A | * | 3/1887 | Kyle | 24/480 |
|---|---|---|---|---|---|
| 546,162 | A | * | 9/1895 | King | 24/104 |
| 1,325,003 | A | * | 12/1919 | Cushman | 24/104 |
| 2,302,341 | A | * | 11/1942 | Nash | 24/479 |
| 4,757,662 | A | * | 7/1988 | Gasser | 52/410 |
| 4,912,829 | A | * | 4/1990 | Hickey | 29/453 |
| 5,033,170 | A | * | 7/1991 | Ewert | 24/459 |
| 5,046,222 | A | * | 9/1991 | Byers et al. | 24/343 |
| 5,103,538 | A | * | 4/1992 | Ryder | 24/662 |
| 5,113,553 | A | * | 5/1992 | Hutchinson | 24/464 |
| 5,168,605 | A | * | 12/1992 | Bartlett | 24/519 |
| 6,675,446 | B2 | * | 1/2004 | Buettell | 24/122.6 |
| 6,718,600 | B1 | * | 4/2004 | Gillis | 24/459 |
| 2004/0069784 | A1 | * | 4/2004 | Reutter | 220/304 |
| 2006/0005363 | A1 | * | 1/2006 | Reiter | 24/459 |

* cited by examiner

*Primary Examiner*—Victor Batson
*Assistant Examiner*—Rowland D Do
(74) *Attorney, Agent, or Firm*—Quinn Law Group, PLLC

(57) ABSTRACT

A directional retention device is provided that provides reliable retention of items as desired when force is applied in one direction but allows easy removal or detachment of the items from one another when force is applied in another direction. Specifically, the directional retention device includes a generally cylindrical button that has a peripheral slot. The device also includes a ring that defines an aperture sized to fit around the button with the ring in the peripheral slot. The button and ring are configured such that the ring is secured to the button when a predetermined force is applied to the ring in a first direction but is released from the button when the predetermined force is applied to the ring in a second direction opposing the first direction.

18 Claims, 3 Drawing Sheets

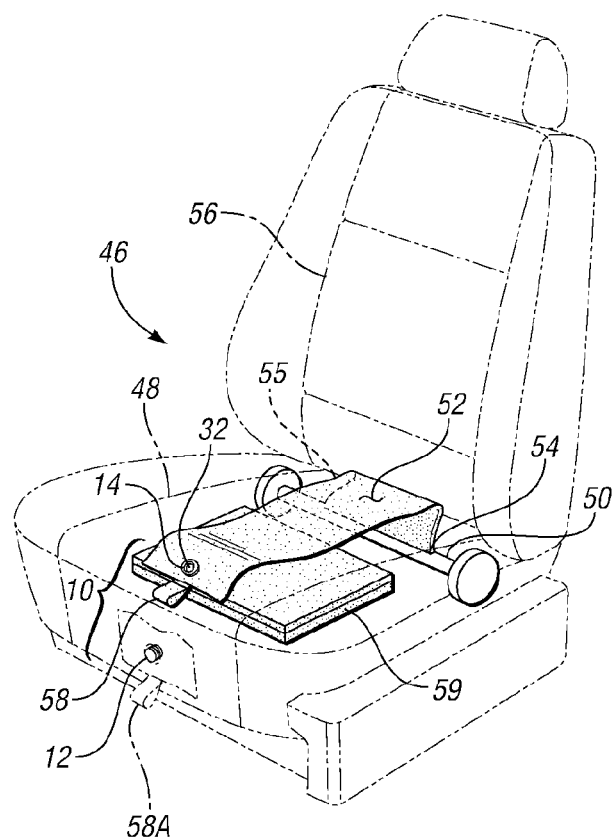
FIG. 6
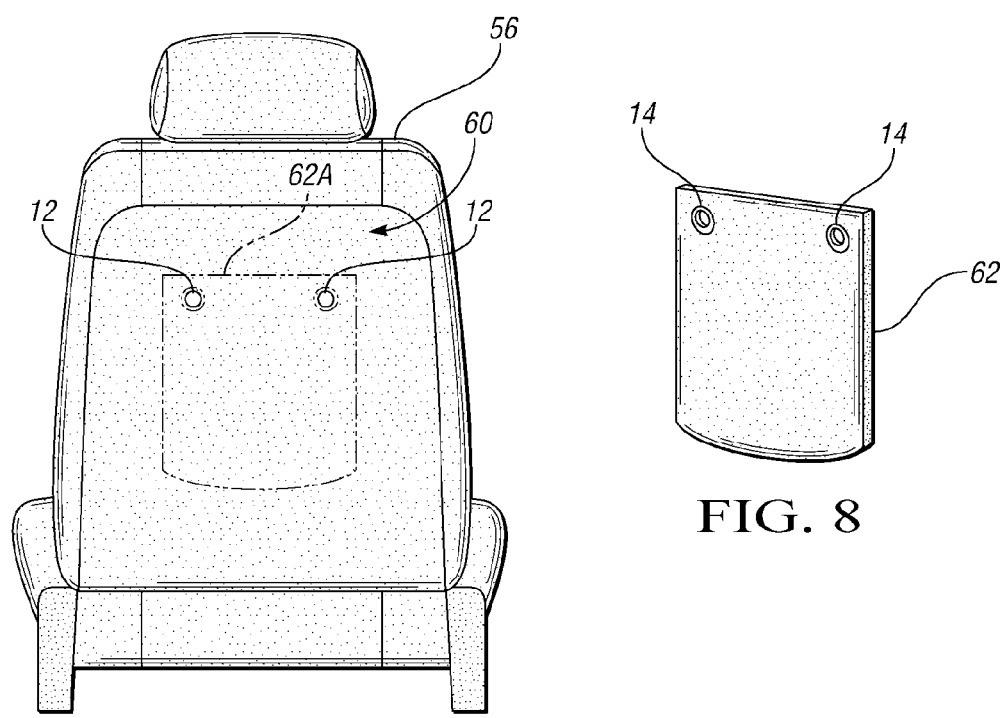
FIG. 7
FIG. 8

US 7,797,799 B2

DIRECTIONAL RETENTION DEVICE

TECHNICAL FIELD

The invention relates to a retention device for selectively retaining two items to one another.

BACKGROUND OF THE INVENTION

Selective retention devices, such as snaps, buttons and other fasteners, are used to retain two items to one another. Manual fasteners should be easy to fasten, afford reliable retention, and yet are easy to detach or release when desired. In certain applications, such as on an accelerating or decelerating vehicle, items retained within the vehicle by fasteners may subject the fastener to additional forces.

SUMMARY OF THE INVENTION

A directional retention device is provided that provides reliable retention of items as desired when force is applied in one direction but allows easy removal or detachment of the items from one another when force is applied in another direction. Specifically, the directional retention device includes a generally cylindrical button that has a peripheral slot. The device also includes a ring that defines an aperture sized to fit around the button with the ring in the peripheral slot. The button and ring are configured such that the ring is secured to the button when a predetermined force is applied to the ring in a first direction but is released from the button when the predetermined force is applied to the ring in a second direction opposing the first direction.

In one embodiment, the slot is not symmetrical about a center axis of the button and has a deep portion and a shallow portion. Furthermore, the slot may have an axially extending recess. The ring may taper from a thickened portion to a thinned portion, and have an extension protruding axially from the thickened portion. The extension may be configured to fit within the recess when the ring is in the slot so that the ring will be further secured to the button when force is applied in a direction to push the extension further into the recess.

The directional retention device may be used for many purposes, including vehicle applications, such as on a vehicle seat assembly, on a vehicle sidewall or on a vehicle floor to selectively retain items within the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 6 is a schematic perspective illustration of a vehicle seat assembly including the directional retention device of FIG. 1;

FIG. 7 is a schematic perspective illustration of a vehicle seat assembly including the button of FIG. 1 secured to the seat and retaining the ring of FIG. 1 secured to a map pocket (shown in phantom);

FIG. 8 is a schematic perspective illustration of the map pocket of FIG. 7 illustrating multiple rings secured to the map pocket;

DESCRIPTION OF THE PREFERRED EMBODIMENTS

Figure 1:
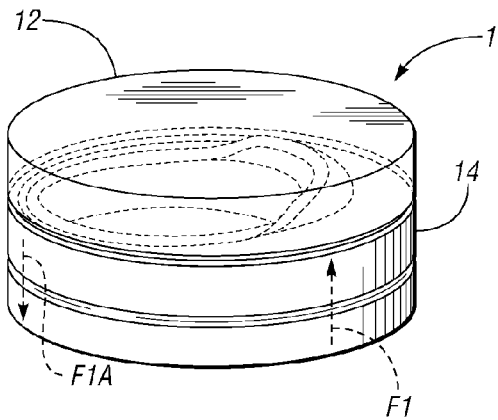
FIG. 1 is a schematic perspective illustration of a directional retention device with a ring retained to a button.

Referring to the drawings, wherein like reference numbers refer to like components, FIG. 1 shows a directional retention device 10 that includes a generally cylindrical button 12 with an annular ring 14 retained thereto. When a force F1 indicated in phantom is applied to the ring 14 in a first direction, appearing as an upward direction in FIG. 1, the ring 14 is secured to and retained by the button 12 due to the configurations of each, as further described below. The force F1 may be applied directly to the ring 14 (shown applied to the thick section of the ring 14 designated 34 in FIG. 4) or may be applied indirectly, such as by applying the force F1 to a component to which the ring 14 is secured, as described further below. Alternatively or at the same time as application of Force F1, a force F1A may be applied in the direction shown in FIG. 1 to the thin section of the ring 14, designated 36 in FIG. 4.

Figure 2:
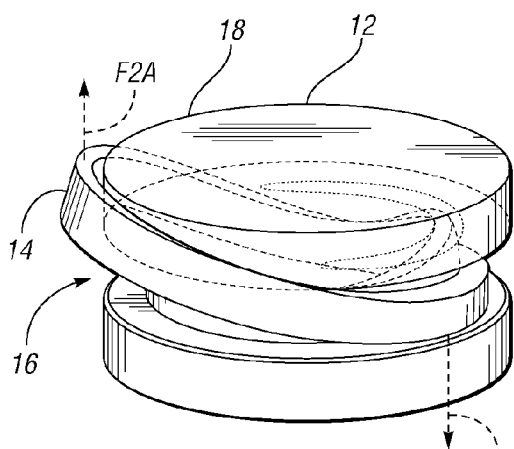
FIG. 2 is a schematic perspective illustration of the directional retention device of FIG. 1, with the ring being selectively released from the button.

Referring to FIG. 2, a force F2 is applied to the thick section of the ring 14 in a direction opposite the direction in which force F1 is applied (i.e., downward in FIG. 2). The force F2 may be of the same or different magnitude as the force F1; however, when applied in the direction indicated the ring 14 releases relatively easily from the button 12 as further explained below. In FIG. 2, the ring 14 is shown partially released by applying a force F2, opposite in direction to force F1, to the thick section of the ring designated 34 in FIG. 4. Alternatively or at the same time, applying the force F2A to the thin section of the ring 14 designated 36 in FIG. 4 causes the ring 14 to move further over a portion 18 of the button 12, out of a peripheral slot 16 formed in the button 12.

Figure 3:
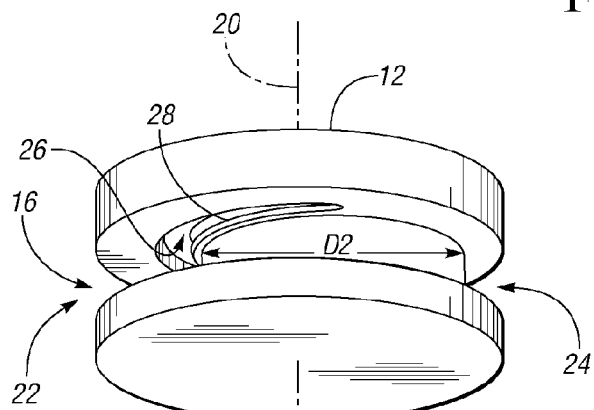
FIG. 3 is a schematic perspective illustration of the button of FIGS. 1 and 2.

Referring to FIG. 3, the button 12 is shown with the ring 14 removed and rotated 180 degrees about a center axis 20 from the view of FIGS. 1 and 2. As is apparent in FIG. 3, the slot 16 is not symmetrical about the center axis 20, resulting in a deep portion 22 opposing a shallow portion 24. The button 12 is formed with an axial extending recess 26 formed in the button 12 at the relatively deep portion 22 of the slot 16, shown extending axially upward in the direction of FIG. 3. Further, the recess 26 has a radially extending pocket 28 that extends toward the center axis 20.

Figure 4:
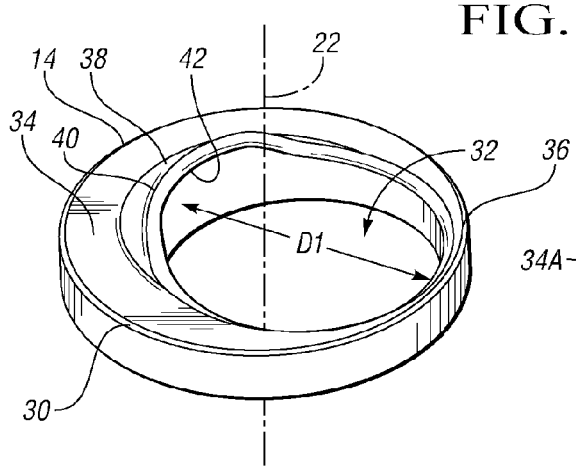
FIG. 4 is a schematic perspective illustration of the ring of FIGS. 1 and 2 shown rotated approximately 180 degrees about a center axis.

Referring to FIG. 4, the ring 14 is illustrated with a center axis 22 of the ring 14 identified. The ring 14 has a generally circular outer circumference 30 and defines a circular center aperture 32 that is offset from the center axis 22 such that the ring 14 has a nonuniform thickness, tapering from a thickened portion 34 to a thinned portion 36. The ring 14 is a flexible material, such as an elastomeric material. The thinned portion 36 is more flexible than the thickened portion 34 due its thinner dimensions. This allows the thinned portion 36 to be removed more easily from the button 12 by force F2A. Additionally, the aperture 32 has a diameter D1 that is larger than the diameter D2 of the button 12 to also make fastening and unfastening of the ring 14 over the portion 18 easier.

The ring 14 has an extension 38 that protrudes axially from the thickened portion 34. The extension 38 has an arced ridge 40 with a radially extending lip 42 at an extremity thereof. The arced ridge 40 slopes toward the center aperture 32 and axially outward from the thickened portion 34. When the ring 14 is secured to the button 12, the extension 38 fits within the recess 26, with the lip 42 extending inward into the pocket 28. The extension 38 and lip 42 act as a hook within the recess 26 and pocket 28 to help maintain securement of the ring 14 to the button 12 when force F1 is applied generally in the direction of the extension 38. In FIG. 2, when force F2 and/or force F2A are applied, to the ring 14, the lip 42 and extension 38 slip out of the pocket 28 and recess 26. Thus, the directional retention device 10 is "directional" in that the ring 14 and button 12 are retained to one another when force of a predetermined magnitude is applied in one direction and are configured to be releasable from one another when force of the same predetermined magnitude is applied in an opposing direction.

Figure 5:
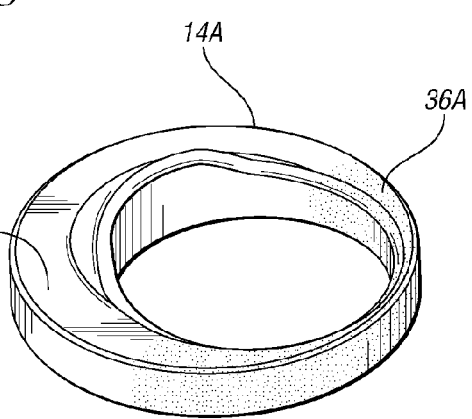
FIG. 5 is a schematic perspective illustration of an alternative two-ply ring for use with the button of FIGS. 1-3.

Referring to FIG. 5, an alternative embodiment of a ring 14A is shown that may be used in place of ring 14 in each of the other Figures herein. Ring 14A is a two-ply ring, having a thinned portion 36A of a first material that is different than a second material used for a thickened portion 34A. The difference in materials is indicated by the shading of the portion of the ring 14A made of the first material. The first material used for the thinned portion 36A is more flexible than the second material used for the thickened portion 34A. For example, the first and second materials may be elastomers, with the second material having a higher modulus of elasticity. This allows the thinned portion 36A to be more easily lifted over portion 18 of the button 12 by force F2A.

Referring to FIG. 6, one exemplary application of the directional retention device 10 is illustrated. The directional retention device 10 is used with a vehicle seat assembly 46. A seat bottom 48 of the seat assembly 46 has a frame member 50 therewithin. A strap 52 extends from a slot 54 within the frame member 50 through a crevice 55 between the seat bottom 48 and the seat back 56. The frame member 50 is anchored by other frame members (not shown) within the seat, but is rotatable about its longitudinal axis by a biasing member or by a power motor to withdraw the strap 52 so that only a pull tab 58 extends out of the crevice. The ring 14 is sewn or otherwise adhered at an opening within the strap 52, with the aperture 32 at the opening and thereby going through the strap 52. The button 12 is secured to a forward side of the seat bottom 48. The tab 58 may be manually pulled forward to the position shown in phantom (in which the tab is indicated as tab 58A, and the ring 14 placed within the slot of the button 12. With the ring 14 secured to the button 12, the strap 52 secures an object 59, such as a laptop, to the seat bottom 48. The button 12 is positioned on the seat bottom 48 with the portion of the button 12 with the recess 26 (see FIG. 3) outward and facing upward, so that a braking force of a vehicle in which the seat assembly 46 is forward facing will place a forward force on the strap, pushing the extension of the ring into the recess further and retaining the ring (and strap) at the button 12. However, the thinned portion of the ring 14 is facing downward when secured to the button 12, and an outward and upward pull of the tab 58A will easily release the ring 14 (and strap 52) from the button 12 to allow removal of the object 59 from the seat assembly 46.

Referring to FIG. 7, a backside 60 of the seatback 56 has additional buttons 12 secured thereto. Rings 14 are secured to another object 62, such as a map pocket (as shown in FIG. 8).

The object 62 is selectively secured to the seatback 56 by placing the rings 14 around the buttons 12, as illustrated by the object in the attached position in FIG. 7, in which it is referred to as object 62A. The button s 12 are secured to the seatback 56 with the portion 18 of FIG. 3 away from the seatback 56 and the recess 26 and pocket 28 shown in FIG. 3 downward.

Figure 9:
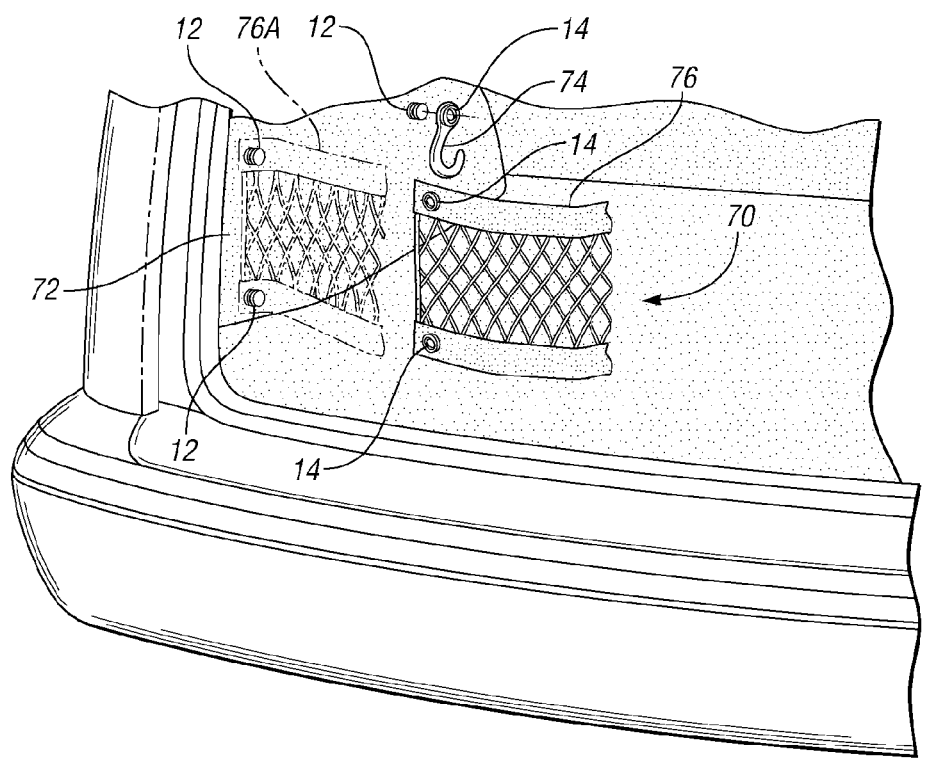
FIG. 9 is a schematic perspective illustration of a vehicle having the button of FIG. 1 secured to a sidewall to retain a cargo net that has the ring of FIG. 1 secured thereto.

Referring to FIG. 9, a vehicle 70 is shown with a rear cargo space defined in part by a sidewall 72. The sidewall 72 has buttons 12 secured thereto at predetermined locations. (Although three buttons 12 are shown in FIG. 9, within the scope of the invention, any number of buttons 12 or a single button 12 may be used.) The buttons 12 extend outward from the sidewall 72 into the cargo space, with recess 26 of each facing outward and forward in the vehicle 70. A trim accessory 74, in the form of a hook, has a ring 14 sewn or otherwise secured thereto. The ring 14 of the hook 74 may be secured to the button 12 to secure the hook 74 to the sidewall 72. A braking force of the vehicle will put a forward force on the hook 74, retaining the hook 74 to the button 12 as the extension 38 (see FIG. 4) of the button 12 will be further pushed into the recess 26 (see FIG. 3). Two additional buttons 12 are secured to the sidewall 72 and are spaced to allow rings 14 secured to a cargo net 76 to be secured to the buttons 12, thus securing the net 76 to the sidewall 72 in which it is referred to as net 76A. Additional buttons and rings are used to secure an opposite end of the cargo net 76 to an opposing sidewall (not shown). The cargo net 76A retains items (not shown) forward of the cargo net 76A in the vehicle 70. Thus, during acceleration of the vehicle 70, these items may put a rearward force on the cargo net 76 and on the buttons 12. Accordingly, the buttons 12 are positioned with the portion 18 with the recess 26 (see FIG. 3) facing outward of the sidewall 72 and forward in the vehicle 70 so that such a force causes the extension 38 (see FIG. 4) on each ring 14 to be further pressed into the respective recess 26 to secure the cargo net 76A to the sidewall 72. The cargo net 76A is easily removed by manually pulling the thinned portion of each ring 14 (which will be rearward in the vehicle 70 when the ring 14 is secured to the button 12) over the button, as illustrated in FIG. 2.

Figure 10:
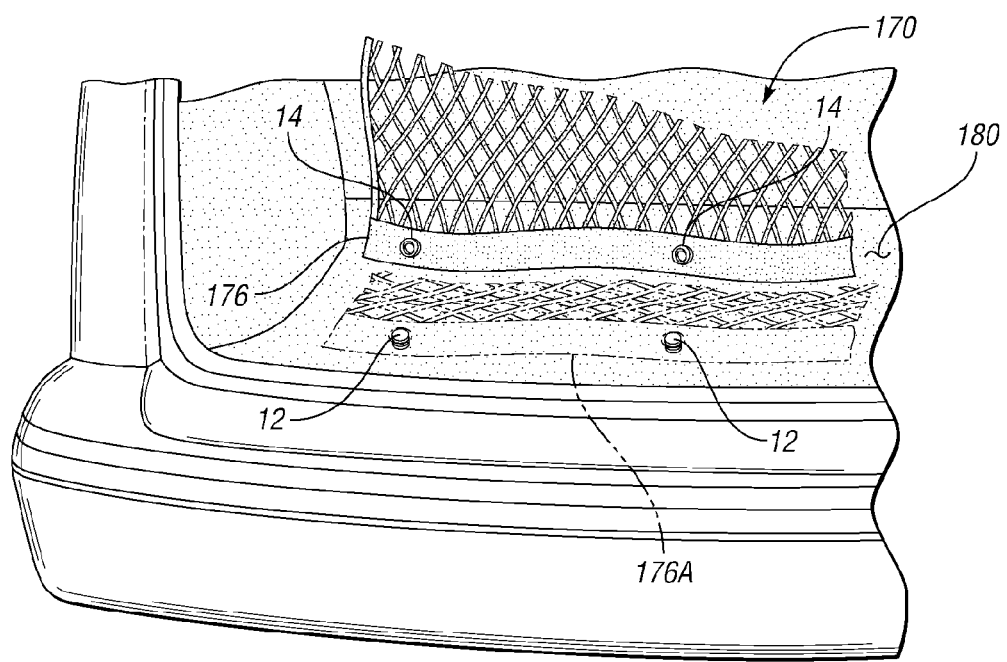
FIG. 10 is a schematic perspective illustration of a vehicle having the button of FIG. 1 secured to a floor for retaining a cargo net that has the ring of FIG. 1 secured thereto.

Referring to FIG. 10, another vehicle 170 is illustrated having a rear cargo space partially defined by a floor 180. Buttons 12 are secured at a predetermined spacing to the floor 180 so that rings 14 on another cargo net 176 can be secured to the respective buttons 12 when the net is moved to a secured position shown in phantom in which the net is referred to as cargo net 176A. The buttons 12 are secured to the floor 180 so that the recess 26 of each button 12 (recess 26 shown in FIG. 3) faces upward and forward in the vehicle 170. Thus, force of items pressing rearward against the cargo net 76 will apply a sideways force on the buttons 12, which will cause the extension 38 of each ring 14 to push into the recess and push the lip 42 (see FIG. 4) further into the pocket 28 (see FIG. 3), further retaining the cargo net 176A to the floor 180. The cargo net 176 is easily removed from the floor 180 by manually pulling the thinned portion 36 of each ring 14 (which will be rearward of the button 12) forward in the vehicle 170, over the respective button 12.

Thus, the directional retention device 10 has many useful applications. Although various uses in vehicles are presented, various nonautomotive uses are also possible, where retention of the ring (and any item it is secured to, such as a strap or net) is desired when force is applied in one direction, with relatively easy selective removal of the ring 14 from the button 12 from an opposing direction.

While the best modes for carrying out the invention have been described in detail, those familiar with the art to which this invention relates will recognize various alternative designs and embodiments for practicing the invention within the scope of the appended claims.

The invention claimed is:

1. A directional retention device comprising:
   a generally cylindrical button with a peripheral slot;
   a ring defining an aperture sized to fit around the button with the ring in the peripheral slot; wherein the button and ring are configured such that the ring is secured to the button when a predetermined force is applied to the ring in a first direction but is released from the button when the predetermined force is applied to the ring in a second direction opposing the first direction;
   wherein the slot is not symmetrical about a center axis of the button and has a deep portion and a shallow portion;
   wherein the slot has an axially extending recess; wherein the ring tapers from a thickened portion to a thinned portion and has an extension protruding axially from the thickened portion; and wherein the extension is configured to fit within the recess when the ring is in the slot, with the thickened portion in the deep portion and the thinned portion in the shallow portion, such that the ring is further secured to the button when force is applied in the first direction to push the extension further into the recess.

2. A directional retention device comprising:
   a ring defining a generally circular aperture displaced from a center of the ring such that the ring is characterized by a nonuniform radial thickness that tapers from a thickened portion to a thinned portion; wherein the ring has an extension protruding axially from the thickened portion;
   a generally cylindrical button having a circumferential slot off-centered from a center axis of the button to form a relatively deep portion and a relatively shallow portion; wherein the button has a recess extending axially from the circumferential slot; wherein the extension is configured to extend into the recess when the ring is placed around the button in the circumferential slot; and wherein the ring is releasable from the button when pulled in a direction opposing the extension, but is retained by the button when pushed in the direction of the extension.

3. The directional retention device of claim 2, wherein the thinned portion is more flexible than the thickened portion to allow ease of removal of the ring from the button at the thinned portion.

4. The directional retention device of claim 2, wherein the extension is an arced ridge sloping toward the center aperture.

5. The directional retention device of claim 2, wherein the relatively deep portion is directly opposite the relatively shallow portion.

6. The directional retention device of claim 2, wherein a diameter of the center aperture is sufficiently larger than a diameter of the button at the slot to allow ease of fastening and unfastening the ring over a portion of the button adjacent the slot.

7. The directional retention device of claim 2, wherein the extension has a radially extending lip extending toward the center axis; and wherein the recess has a radially extending pocket extending toward the center axis and configured to retain the lip to further secure the ring to the button.

8. The directional retention device of claim 2, wherein the thinned portion of the ring is a first material and the thickened portion of the ring is a second material; and wherein the first material is more flexible than the second material to promote ease of removal of the ring from the button when force is applied to the thinned portion.

9. A directional retention device for a vehicle comprising:
   a generally cylindrical button with a center axis; wherein the button has an off-center peripheral slot with a relatively deep portion and a relatively shallow portion; wherein the button is formed with a recess extending in an axial direction in the deep portion;
   a ring with a thickened portion and a thinned portion; wherein the ring has an extension protruding in the axial direction from the thickened portion; wherein the ring has a center aperture and is configured to fit in the slot with the center aperture encircling the button, with the thinned portion in the shallow portion, with the thickened portion in the relatively deep portion, and with the extension in the recess so that the ring is retained by the button when force is applied to push the extension into the recess, and the ring is removable from the button when force is applied to the thinned portion to pull the extension out of the recess.

10. The directional retention device of claim 9, wherein the extension is an arced ridge sloping toward the center aperture.

11. The directional retention device of claim 9, wherein the relatively deep portion is directly opposite the relatively shallow portion.

12. The directional retention device of claim 9, wherein a diameter of the center aperture is sufficiently larger than a diameter of the button at the slot to allow ease of fastening and unfastening the ring over a portion of the button adjacent the slot.

13. The directional retention device of claim 9, wherein the extension has a radially extending lip extending towards the center axis; and wherein the recess has a radially extending pocket extending toward the center axis and configured to retain the lip to further secure the ring to the button.

14. The directional retention device of claim 9 in combination with a vehicle seat assembly; wherein the seat assembly includes a strap; wherein the strap has a portion secured to a seat structure;
   wherein the button is secured to the seat structure; wherein the ring is secured to the strap; and wherein the strap is further selectively secured to the seat structure when the ring is secured to the button.

15. The directional retention device of claim 9 in combination with a vehicle seat assembly and a first object; wherein the button is secured to the vehicle seat assembly and the ring is secured to the first object; and wherein the first object is retained to the vehicle seat assembly when the ring is secured to the button.

16. The directional retention device of claim 9 in combination with a vehicle having a sidewall and a first object; wherein the button is secured to the sidewall and the ring is secured to the first object; and wherein the first object is retained to the sidewall when the ring is secured to the button.

17. The directional retention device of claim 9 in combination with a vehicle having a floor and a first object; wherein the button is secured to the floor and the ring is secured to the first object; and wherein the first object is retained to the floor when the ring is secured to the button.

18. The directional retention device of claim 9, wherein the thinned portion of the ring is a first material and the thickened portion of the ring is a second material; and wherein the first material is more flexible than the second material to promote ease of removal of the ring from the button when force is applied to the thinned portion.

* * * * *